United States Patent Office 3,414,548
Patented Dec. 3, 1968

3,414,548
ADDITION POLYMERS OF DICYCLO PENTADIENE ISOCYANATES AND VINYLIC COMPOUNDS
Herbert Bartl, Cologne-Stammheim, and Gerhard Muller and Rudolf Merten, Leverkusen, Germany, assignors to Farbenfabriken Bayer Aktiengesellschaft, Leverkusen, Germany, a corporation of Germany
No Drawing. Filed May 20, 1965, Ser. No. 457,478
Claims priority, application Germany, May 26, 1964, F 42,990
6 Claims. (Cl. 260—85.5)

ABSTRACT OF THE DISCLOSURE

A process for preparing copolymeric polyisocyanates by reacting the polycycloaliphatic isocyanate addition product of carbamic acid-O-alkyl or -aryl esters with dicyclopentadienes with a compound containing at least one vinyl group, wherein the polycycloaliphatic isocyanate has the structure

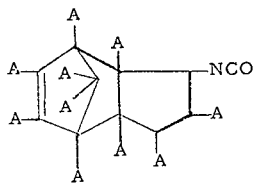

wherein A is a member selected from the group consisting of hydrogen, halogen, an alkyl radical, a cycloalkyl radical, an aryl radical, an alkoxy radical, an alkoxy carbonyl radical and an aroxy radical.

This invention relates to high molecular weight isocyanates, and more specifically, to the preparation of copolymers of polycyclic polyisocyanates, or polycycloaliphatic polyisocyanates.

Heretofore in the preparation of polycycloaliphatic polyisocyanates, a problem has been encountered in that the polyisocyanates obtained had their reactive isocyanate groups connected to the main polymer chain through carbon bonds which were particularly susceptible to hydrolysis or oxidation processes thus resulting in a splitting of the isocyanate-containing substituent from the remainder of the polymer. Further, when a material such as dicyclopentadiene had been employed to prepare polycyclic polyisocyanates from which polycycloaliphatic polyisocyanates are prepared, the cyclopentadiene itself seriously interfered in the copolymerization of the isocyanate reactants.

It is, therefore, an object of this invention to provide a new polycycloaliphatic polyisocyanate copolymer which is devoid of the foregoing disadvantages.

It is a further object of the present invention to provide a method for the preparation of polycycloaliphatic polyisocyanates which are not susceptible to hydrolysis and oxidation of the carbon bonds by which the reactive NCO groups are connected to the main polymeric chain.

A further object of this invention is to provide a copolymer of a vinyl compound and a polycyclic isocyanate wherein the substituents of the isocyanate do not interfere with the copolymerization of the isocyanate with the vinyl compound.

The foregoing objects and others which will become apparent from the following description are accomplished in accordance with the present invention, generally speaking, by providing a novel polyisocyanate by a process which comprises reacting a compound containing at least one vinyl group with an isocyanate having the formula

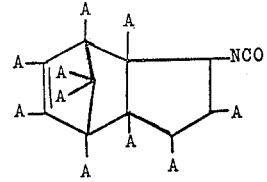

wherein A is a member selected from the group consisting of hydrogen, halogen, an alkyl radical, a cycloalkyl radical, an aryl radical, an alkoxy radical, an alkoxy carbonyl radical and an aroxy radical.

The polycyclic isocyanates from which the copolymers of this invention are prepared are themselves prepared by adding carbamic acid-O-alkyl or aryl esters to dicyclopentadienes which may or may not be substituted as suits the exigencies of the occasion, and the carbamic-O-alkyl or aryl ester of the dicyclopentadiene thus produced is then converted into the free isocyanate by heating it with an excess of a higher boiling isocyanate. Although it is not certain, it is believed that the resulting isocyanate has the structure

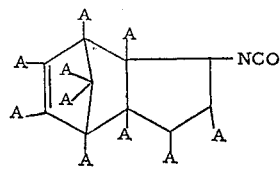

wherein A is as above-defined.

The preparation of the isocyanate itself may be carried out according to any of the methods already known for preparing such compounds. As an example of a suitable method of preparation, the cyclopentadienes may first be obtained by the dimerization of cyclopentadiene or substituted cyclopentadienes or mixtures thereof. A carbamic acid alkyl or aryl ester is added to the dicyclopentadiene thus obtained and the carbamic acid ester which results is then converted into the free isocyanate by heating it with an excess of a higher boiling isocyanate. This preparation is preferably carried out under substantially anhydrous conditions at a temperature of from about 100° to about 270° C. and, if desired, in the presence of a catalyst as more fully set forth below.

The process can be represented by the following equation:

wherein R, R′ and R″ represent organic radicals.

This process offers an excellent method for the production of isocyanates where the corresponding amine is unobtainable or only obtainable with a great deal of difficulty. It is not necessary to proceed through the amine route at all, but one may obtain the N-substituted carbamic acid esters used as starting materials in good yields by the addition of cationically polymerizable olefins to carbamic acid esters (see Belgian Patent 625,748). The conditions for the production of isocyanates are also very gentle and the lower boiling isocyanate produced can be extracted from the reaction medium immediately after it is formed.

Some of the substituted carbamic acid esters used as starting materials for the process of the present invention are described in the literature and can be produced by the reaction of the corresponding amines with chlorocarbonic acid esters, including phosgene, by well-known reactions. The carbamic acid esters are preferably nitrogen substituted and have the general formula RNHCOOR' wherein R and R' are organic radicals which are preferably either saturated or unsaturated, substituted or unsubstituted hydrocarbon radicals, including alkyl, alkenyl, cycloalkyl, cycloalkenyl, aralkyl, alkaryl, aryl, heterocyclic and the like or mixtures thereof. R' is preferably a saturated or unsaturated alkyl, cycloalkyl, aralkyl, aryl, heterocyclic or the like. The radical R, in this case is dicyclopentadiene, although any of a myriad of radicals may be used as far as the process itself is concerned. To give specific examples for R' where the organic radical is an alkyl group it may be any suitable alkyl radical including, for example, methyl, ethyl, propyl, butyl, amyl, hexyl, heptyl, octyl, nonyl, decyl or the like, preferably having from 1 to 10 carbon atoms. Where alkenyl radicals are contemplated, any suitable alkenyl radical may be used such as, for example, ethenyl, 1-propenyl, 2-butenyl, 1-pentenyl, 2-pentenyl, 1-hexenyl, 2-hexenyl, 1-heptenyl, 3-heptenyl, 1-octenyl, 5-octenyl, 1-nonenyl, 1-decenyl and the like. Where cycloalkyl radicals are contemplated, any suitable cycloalkyl radical may be used including, for example, cyclobutyl, cyclopentyl, cyclohexyl, cyclooctyl and the like. Where cycloalkenyl radicals are contemplated, any such suitable radical may be used including for example, cyclopentenyl, cyclohexenyl, cyclooctenyl and the like. Where aralkyl radicals are contemplated, any such suitable radical may be used including, for example, benzyl, phenyl ethyl, phenyl propyl and the like. Any suitable alkaryl radical may be used including, for example, tolyl, xylyl or the like. Any suitable aryl radical may be used including, for example, phenyl, diphenyl or the like. Any suitable heterocyclic radical may be used including, for example, 3-pyridyl, indolyl, triazolyl or the like. It is to be understood that this list is merely representative and is in no way complete.

Any suitable organic isocyanate may be used for reaction with the carbamic acid esters provided that its boiling point is above that of the isocyanate formed from the N-substituted carbamic acid ester. It is preferred that the boiling point be at least ten degrees above the boiling point of the isocyanate to be formed from the N-substituted carbamic acid ester. The following are examples of mono- and polyisocyanates which are suitable to be used in accordance with the process of the invention. It is to be understood that the radical R'' employed in the foregoing equation illustrating the process of the invention can be obtained by removing one —NCO group from the isocyanates listed below. The isocyanates preferably have the formula R''(NCO)$_n$ where $n$ is 1–4.

Any suitable aliphatic monoisocyanate and/or polyisocyanate may be used such as dodecyl, oleyl and stearyl isocyanates, hexane and dodecane diisocyanates, aromatic monoisocyanates and/or polyisocyanates such as phenyl isocyanate, substituted phenyl isocyanates, such as 2,4,6-trimethyl phenyl isocyanate and 3,4-dichlorophenyl isocyanate, diphenylmethane-4-isocyanate, naphthyl-2-isocyanate and pyrenyl-3-isocyanate, as well as diisocyanates of benzene and its homologues, for example, 1,3-phenylene-, 1,4-phenylene-, 1-methyl-benzene-2,4- and 1-methyl-benzene-2,6-diisocyanate and their isomeric mixtures, mono-, di- and triisopropyl-benzene diisocyanates, polyisocyanates of naphthalene, diphenylmethane and triphenylmethane, with polynuclear ring systems or of polyphenyl compounds. Examples of the last mentioned classes of substance are naphthalene-1,4-, naphthalene-1,5-, diphenyl-4, 4'-, diphenylmethane-4,4'-, anthraquinone-2,6-, triphenylmethane-4,4',4''-triisocyanate, 4,4'-dimethyl-diphenylmethane-2,2'5,5'-tetraisocyanate, 4,4'4'''-triisocyanatophosphoric acid triphenyl ester as well as polyphenyl polymethyl polyisocyanates as disclosed in U.S. Patent 2,683,730, such as are obtained by aniline/formaldehyde condensation and subsequent phosgenation. The polyisocyanates can also be substituted by halogen, alkoxy, azo, nitro, cyano, ester or sulphone groups. Examples of these are 1-chlorobenzene-, 1-nitrobenzene-, and 1-methoxybenzene-2,4-diisocyanate, tetrachloro-p-phenylene diisocyanate, azobenzene-4,4'-diisocyanate and benzidine-sulphone-4,4'-diisocyanate.

Mixtures of different monoisocyanates and/or polyisocyanates, possibly in crude form, can be used for carrying out the reaction with the carbamic acid ester.

It is necessary to carry out the reaction under substantially anhydrous conditions and in many cases it is desirable to use an inert organic solvent. Some suitable solvents include hydrocarbons such as, for example, benzene, benzine, heptane, octane, hexane, naphthalene and the like, halogenated hydrocarbons such as orthodichlorobenzene, esters such as ethylene glycol, monoethylether acetate; ketones such as acetone, methylpropyl ketone or the like; ethers such as diethyl ether of diethylene glycol; sulphides such as dimethyl sulphide; sulphones such as dimethyl sulphone; substituted amides such as N-methyl pyrrolidone as well as mixtures thereof or the like.

The production of the organic monoisocyanates may be carried out by direct reaction between the N-substituted carbamic acid esters and the higher boiling mono- and poly-isocyanates. It is often expedient to work under a blanket of inert protective gas such as nitrogen or argon when carrying out the reaction. Moreover, it is often advantageous to add a catalyst for the reaction. Both acid and basic catalysts may be used in anhydrous form. Examples of acid catalysts include the Lewis type such as, for example, boron trifluoride, sulfuric acid, para-toluene sulphonic acid, hydrochloric acid, zinc chloride and the like. One may also use carbamic acid chloride, acid ion exchangers, iron acetonyl acetonate, molybdenum chloride, dibutyl tin diacylates such as, for example, dibutyl tin dilaurate, stannous acylates such as stannous octoate, stannous oleate and the like. Examples of basic catalysts include the following which are exceptionally suitable for promoting the reaction of stearically hindered isocyanates: dimethyl benzyl amine, triethylene diamine, permethylated diethylene triamine, N-alkyl morpholines such as N-ethyl morpholine, N-methyl morpholine and the like. In some cases it is even possible to use potassium carbonate or sodium hydroxide as the basic catalyst. The proportions between the N-substituted carbamic acid ester and the higher boiling monoisocyanate or polyisocyanate can be varied over wide ranges provided there is at least one equivalent of isocyanate present for each urethane grouping. The reaction is preferably carried out at a temperature of from about 100 to 270° C., most preferably between 150 and 250° C. The time of reaction varies but is usually complete within a few hours. The reaction components can be initially supplied to the reaction vessel simultaneously while mixed with a solvent and heated. In some cases, however, it may be expedient to only supply one reaction component in bulk to the reaction vessel and then gradually add the second component. The mechanism of the reaction is not understood but it may be assumed that it proceeds through the intermediate formation of allophanates.

The isocyanate prepared, depending on the cyclopentadiene dimer employed initially may be either substituted or unsubstituted. As already mentioned, the groups A in the formula defined herein may be hydrogen, halogen, an alkyl radical, a cycloalkyl radical, an aryl radical, an alkoxy radical, an alkoxycarbonyl radical or an aroxy radical or mixtures thereof.

Any suitable halogen may be the substituent A including chlorine, fluorine, bromine and iodine.

Any suitable alkyl radical may be the substituent A but most preferably, an alkyl radical having from 1 to 20 carbon atoms should be used. Some such suitable alkyl radicals are methyl, ethyl, n-propyl, isopropyl, n-butyl, isobutyl, sec-butyl, t-butyl, n-pentyl, 1-methyl-butyl, 2-methyl-butyl, 3-methyl-butyl, 1,1-dimethylpropyl, 1,2-dimethyl-propyl, 2,2-dimethylpropyl, 1-ethylpropyl, hexyl, heptyl, octyl, nonyl, decyl, undecyl, dodecyl, tridecyl, tetradecyl, pentadecyl, hexadecyl, heptadecyl, octodecyl, nondecyl, eicosyl, and the like.

Any suitable cycloalkyl radical may be the substituent A but most preferably, a cycloalkyl radical having from 3 to 20 carbon atoms, including cyclopropyl, cyclobutyl, cycloamyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, cyclooctodecyl, cyclonondecyl, cycloeicosyl, alpha-cyclopropyl-ethyl, beta-cyclopropyl-ethyl, alpha-cyclobutyl-propyl, gamma-cyclobutyl-propyl, alpha-cycloamyl-isopropyl, beta-cycloamyl-isopropyl and the like.

Any suitable aryl radical may be used as the substituent A such as, for example, phenyl, alpha-naphthyl, beta-naphthyl, alpha-anthryl, beta-anthryl, gamma-anthryl, indene, isoindene, acenaphthene, fluorene, phenanthrene, naphthacene, chrysene, pyrene, triphenylene and the like.

Any suitable alkoxy radical may be used as the substituent A but most preferably, an alkoxy radical having from 1 to 20 carbon atoms. Some such suitable radicals are methoxy, ethoxy, n-propoxy, isopropoxy, n-butoxy, isobutoxy, sec-butoxy, t-butoxy, n-pentoxy, 1-methyl-butoxy, 3-methyl-butoxy, 1,1-dimethylpropoxy, 1,2-dimethylpropoxy, 2,2-dimethylpropoxy, 1-ethylpropoxy, hexoxy, heptoxy, octoxy, nonoxy, decoxy, undecoxy, dodecoxy, tridecoxy, tetradecoxy, pentadecoxy, hexadecoxy, heptadecoxy, octodecoxy, nondecoxy, eicosoxy and the like.

Any suitable aroxy radical may be used as the substituent A including phenoxy, alpha-naphthoxy, beta-naphthoxy, alpha-anthroxy, beta-anthroxy, gamma-anthroxy and the like.

Any suitable alkoxycarbonyl radical may be used as the substituent A including carbmethoxy, carbethoxy, n-carbpropoxy, isocarbpropoxy, n-carbutoxy, isocarbutoxy, sec-carbutoxy, t-carbutoxy, n-carbpentoxy, 1-methyl-carbutoxy, 2-methyl-carbutoxy, 3-methyl-carbutoxy, 1,1-dimethylcarbpropoxy, 1,2-dimethylcarbpropoxy, 2,2-dimethylcarbpropoxy, 1-ethylcarbpropoxy, carbhexoxy, carbheptoxy, carbnonoxy, carbdecoxy, carbundecoxy, carbdodecoxy, carbtridecoxy, carbtetradecoxy, carbpentadecoxy, carbhexadecoxy, carbheptadecoxy, carboctodecoxy, carbnondecoxy, carbeicosoxy and the like.

The isocyanate finally prepared, in addition to having a free NCO group available for reaction, may also have the NCO group masked by any suitable substituent which will split off again relatively easily upon the application of heat. Some such suitable substituents are, for example, phenols, bisulphites, malonic esters, epsilon-caprolactam, alpha-pyrrolidone, compounds having active methylene groups and in a wider sense, the carbamic acid esters of the polycycloaliphatic isocyanates with alcohols or mercaptans.

It is surprising that the unsaturated polycyclic isocyanate of the herein-defined formula does not seriously interfere with copolymerization as do the original starting products for the isocyanates, e.g. dicyclopentadiene.

A preferred starting isocyanate is that of the formula

In the copolymerization process itself, any suitable vinyl compound which is copolymerizable with the isocyanate either in its free or masked form may be used. Some such suitable vinyl compounds are, for example, ethylene, propylene, acrylic or methacrylic acid derivatives such as methyl-, ethyl-, propyl-, and butyl ester, and styrene, methyl styrene, ethyl styrene, dimethyl styrene, propyl styrene, vinyl acetate, vinyl propionate, vinyl benzoate and vinyl chloride, vinylidene chloride, butadiene, isoprene, and especially acrylonitrile.

Preferred copolymerization partners are acrylonitrile, styrene and the methacrylic esters.

Any suitable proportions of vinyl compound to isocyanate may be used, depending on the type of copolymer best suited to the needs of the operator. However, it is preferable that the proportion of vinyl compound to isocyanate is from about 99% to about 80% by weight of the vinyl compound to about 1 to about 20% by weight of the polycyclic isocyanate. The double bond of the vinyl group opens as does the double bond of the polycyclic isocyanate to thus copolymerize by means of the mutual unsaturation to yield a polycycloaliphatic polyisocyanate copolymer.

The copolymerization reaction may be carried out either in bulk or in an inert solvent solution when the isocyanate being polymerized has a free and not masked NCO group. Any suitable inert solvent may be used. Some such suitable solvents are, for example, esters of acetic acid such as ethyl acetate, propyl acetate, butyl acetate and the like, ketones such as methyl ethyl ketone, ethers such as tetrahydrofuran, dioxane and the like, ethylene glycol monomethyl ether acetate, chlorinated aliphatic, hydroaromatic or aromatic hydrocarbons such as trichloroethane, chlorocyclohexane, monochlorobenzene and the like, tertiary butanol, dimethylformamide, benzene, dimethyl acid amide, dimethyl sulfoxide and the like. Where the isocyanate group is masked, the masked isocyanate may also be polymerized in an aqueous dispersion, emulsion or suspension since the highly reactive NCO group is not available to react with the reaction medium.

The copolymerization may be carried out either with or without a polymerization catalyst although it is most preferable that a polymerization initiator be used. Some such suitable catalysts are, for example, azodiisobutyric acid nitrile, benzoyl peroxide, potassium persulphate/sodium pyrosulphite, dichlorobenzoyl peroxide, lauroyl peroxide, peroxydicarbonate. About 0.1 to 2% of the catalyst calculated on the quantity of the polymerizable reaction mixture is usually sufficient.

A special advantage of the isocyanate-vinyl containing compound copolymers of the present invention is that their reactive NCO groups are connected to the main polymer chain through stable carbon bonds and cannot be separated from the main polymeric chain by hydrolysis or oxidation. Further, these polymers are eminently suitable for the production of coatings such as lacquers and textile coatings and for impregnations or for the production of shaped articles and fibers.

The polymers which contain free or masked isocyanate groups can be easily cross-linked through their isocyanate groups by means of a trimerization reaction to a compound having at least one isocyanurate ring as demonstrated by the following structure:

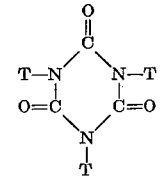

wherein T is the residue of a co-polymer prepared according to the present invention.

Compositions having a higher molecular weight per branch point may be obtained by means of any suitable type of trimerization process but preferably by means of a catalyst which will form a composition having isocyanurate rings from the isocyanate copolymer of this invention. Any suitable trimerization catalyst may be employed, but preferably catalysts such as N-methyl-N'-(dimethyl amino ethyl) piperazine, permethylated diethylamino propyl amine, permethylated epoxy propyl amine, permethylated methoxy propyl amine, permethylated diethylene triamine, the reaction produce of diethylethanolamine and phenyl isocyanate, alkali salts of phenols, calcium acetate, sodium acetate, potassium benzoate and the like or mixtures thereof may be employed.

Further, the copolymers of this invention are eminently suitable for the preparation of polyurethane polymeric materials by the reaction with any suitable organic compound containing at least two active hydrogen containing groups as determined by the Zerewitinoff method. Generally speaking, any compound having an active hydrogen atom as determined by the Zerewitinoff method and which will react with an —NCO group may be used. Hydroxyl groups react with —NCO groups to yield urethane groups whereas carboxylic acids yield amide groups and amines yield ureas. The alcoholic group is strongly preferred because it is readily available and yields a stronger urethane linkage than a phenolic type hydroxyl group. Moreover, to prepare polyurethane plastics, it is preferred to use an active hydrogen containing organic compound of the type which contains a plurality of active hydrogen containing groups and preferably at least some alcoholic hydroxyl groups. It is to be understood that active hydrogen containing compounds are contemplated which may contain any of the following types of active hydrogen containing groups, among others, —OH, —NH$_2$, —NH, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including aromatic, aliphatic and heterocyclic diamines, triamines, tetramines and the like; as well as mixtures thereof. Compounds which contain two or more different groups within the above-defined classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and an —SH group and the like.

The invention is further illustrated but is not intended to be limited by the following examples in which all parts and percentages are by weight unless otherwise specified.

EXAMPLE 1

A mixture of about 100 parts of anhydrous tertiary butanol, about 45 parts of acrylonitrile, about 0.3 part of alpha, alpha'-azodiisobutyric acid nitrile and about 5 parts of the isocyanate

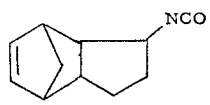

are stirred for about 6 hours at about 65° C. A pulverulent dispersion is obtained which can easily be filtered. Yield: 30 parts. A reaction between the isocyanate and tertiary butanol to form a masked isocyanate also takes place in the reaction mixture.

About a 20% solution of the polymer thus formed is prepared using dimethylformamide as the solvent, and the solution is divided into three portions, to each of which is added 2%, 4% and 6% respectively, of trimethylol propane. The resulting solutions are each poured out to form films which are cross-linked by heating to about 180° C. for about 20 to 30 minutes.

EXAMPLE 2

A mixture of about 80 parts of methyl methacrylate, in which about 0.5 part of benzoyl peroxide is dissolved, and about 20 parts by weight of the isocyanate of Example 1 are heated to about 80° C. for about 4 hours. A hard, glass clear block polymer is obtained.

EXAMPLE 3

A mixture of about 80 parts of styrene, in which about 0.5 part of benzoyl peroxide is dissolved, and about 20 parts by weight of the isocyanate from Example 1 is heated to about 80° C. for about 24 hours. A hard, glass-clear block copolymer is obtained.

EXAMPLE 4

About 80 parts of acrylonitrile and about 20 parts of the masked isocyanate

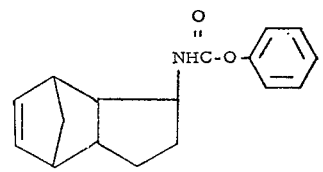

are stirred and polymerized for about 5 hours at about 50° C. in an aqueous dispersion of a volume of about 700 parts of water which contains about 0.8 part of potassium persulphate and about 1.5 parts of sodium pyrosulphite in solution. About 80 parts of a polymer having a K-value of about 76 and an oxygen content of about 4% are obtained.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A hydrolysis and oxidation resistant polyisocyanate prepared by a process which comprises reacting a compound containing at least one vinyl group with an polycycloaliphatic isocyanate having the formula,

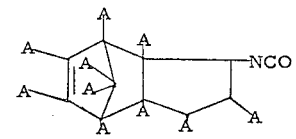

wherein A is a member selected from the group consisting of hydrogen, halogen, an alkyl radical, a cycloalkyl radical, an aryl radical, an alkoxy radical, an alkoxy carbonyl radical and an aroxy radical, cross the double bonds.

2. A hydrolysis and oxidation resistant polyisocyanate prepared by a process which comprises reacting across the double bonds a compound containing at least one vinyl group with an polycycloaliphatic isocyanate of the formula

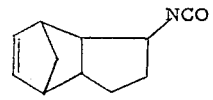

3. A hydrolysis and oxidation resistant polyisocyanate prepared by a process which comprises reacting about 99% to about 80% by weight of a compound containing at least one vinyl group with about 1% to about 20% by weight of an polycycloaliphatic isocyanate having the formula,

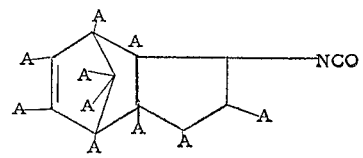

wherein A is a member selected from the group consisting of hydrogen, halogen, an alkyl radical, a cycloalkyl radical, an aryl radical, an alkoxy radical, an alkoxy carbonyl radical and an aroxy radical, across the double bonds.

4. A hydrolysis and oxidation resistant polyisocyanate prepared by a process which comprises reacting across the double bonds about 99 to about 80% by weight of a compound containing at least one vinyl group with about 19 to about 20% by weight of an polycycloaliphatic isocyanate of the formula,

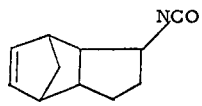

5. The polyisocyanate of claim 1 wherein the isocyanate groups of a polycycloaliphatic isocyanate are masked.

6. The polyisocyanate of claim 1 wherein the compound containing at least one vinyl group is acrylonitrile, styrene or a methacrylic ester.

References Cited

UNITED STATES PATENTS 2,326,287  8/1943  Coffman _____ 260—84

OTHER REFERENCES

Hoover et al.: React. of Isocyanic Acid with Olefins, J. of Org. Chem. 29, 143 (1964).

JOSEPH L. SCHOFER, *Primary Examiner.*

C. A. HENDERSON, *Assistant Examiner.*